Nov. 25, 1969     H. N. LACROIX     3,480,408

PHTHALIC ANHYDRIDE REACTOR

Filed May 15, 1967

INVENTOR.
HENRY N. LACROIX
BY
ATTORNEY

United States Patent Office 3,480,408
Patented Nov. 25, 1969

3,480,408
PHTHALIC ANHYDRIDE REACTOR
Henry N. LaCroix, East Orange, N.J., assignor to Foster Wheeler Corporation, Livingston, N.J., a corporation of New York
Filed May 15, 1967, Ser. No. 638,372
Int. Cl. B01j 9/18; C07c 63/18
U.S. Cl. 23—288                                 5 Claims

ABSTRACT OF THE DISCLOSURE

An apparatus for producing a phthalic anhydride-containing effluent gas by reacting oxygen with naphthalene or ortho-xylene in the presence of a suitable fluidized catalyst. The reactor is provided with a filtering zone surrounded by indirect heat exchange units for settling and cooling the catalyst and cooling the effluent gas.

Background of the invention

Phthalic anhydride is produced in conventional fluid bed reactors by reacting a charge material with oxygen in the presence of a suitable catalyst. The charge material consists of naphthalene or ortho-xylene, and the catalyst consists of a suitable oxide from Group V–B and VI–B of the periodic system, with vanadium being the most preferable element. The phthalic anhydride reaction occurs under favorable conditions when an excess of oxygen is introduced into the reaction zone. Accordingly, phthalic anhydride is produced when quantities of oxygen are introduced into the reactor in excess of the quantities which are required by the oxidation reactions represented by the formulae:

$C_8H_{10}$ (ortho-xylene) $+3O_2 \rightarrow$
    $C_8H_4O_3$ (phthalic anhydride) $+2H_2O+2CO_2$ $C_8H_{10}$ (ortho-xylene) $+3O_2 \rightarrow$
    $C_8H_4O_3$ (phthalic anhydride) $+3H_2O$ In conventional fluid bed reactors, the main reaction takes place in the dense phase portion of the catalyst bed, under conditions which include minimized excess weight ratios of oxidation air and direct contact cooling of the catalyst bed by tubes containing a cooling medium. Due to the relatively high temperatures in the reactor vessel, steam is usually used as the cooling means. As the reaction takes place, the gases rise to the top of the catalyst bed forming a froth or bubbly layer. Through the rapidly rising gas flow caused by the reaction, there is an expansion of the catalyst material such that eruption or heavy bubbling lifts the catalyst material, with, some of such catalyst being thrown into the gas phase above the frothy surface. In order to prevent the loss of catalyst material, the gas is passed through filters at the top of the reactor, and catalyst particles adhere to the filters such that after-burning may occur which could result in a severe conflagration and destruction of the equipment. Thus, in conventional apparatus, quenching is usually maintained on a continuous basis by introducing cool air above the light catalyst phase and below the catalyst filters. The excessive concentration of catalyst on the filters is prevented by the periodic air blow-back of the filters. The combined effect of this quenching procedure results in the dilution of the reaction products, thereby increasing the mass of the non-condensable gases, and also reducing the temperature at which condensation of the reaction products will occur. This increases the cost requirements for the subsequent condensing operation, and also increases the loss of phthalic anhydride product recovered, which is proportional to the total amount of non-condensable gas. Further, the introduction of cool air into the reactor decreases the temperature of the effluent gas such that the potential for subsequent heat recovery is decreased.

In accordance with the present invention, it has been found that it would be possible to surround the filters with a cooling circuit through which a cooling medium such as water can be circulated at the proper temperature to remove heat. Thus, the cooling circuit which is in indirect heat exchange relationship with the filters provides for heat recovery from the reaction products and non-condensable gases and the incidence of fires can be reduced greatly or eliminated. In the event that some particles do adhere to the filters in any significant amount, high velocity blowers can be utilized to periodically back-blow the filters, in order to dislodge any solid particles. The removal of heat from the filters results in an improvement in the overall utility consumption of the plant. Further, the utilization of an indirect heat exchange arrangement, allows for the elimination of direct cooling introduced into the reactor through the admission of quenching air. By eliminating the use of quenching air there is a lesser tendency for the reaction products to become diluted, and less phthalic anhydride is lost with the non-condensable gases that leave the condenser.

Brief summary of the invention

In accordance with the present invention, a reactor vessel is provided, for producing a phthalic anhydride-containing gas, which is formed with an internal chamber having an inlet opening and an outlet opening. Means are provided for introducing an oxygen-containing gas such as air into the internal chamber and for introducing naphthalene or ortho-xylene into the internal chamber. Direct cooling means and a fluidized bed consisting of a suitable metal oxide catalyst capable of supporting a chemical reaction to produce the phthalic anhydride-containing gas are provided in the internal chamber. Filtering means are positioned in the internal chamber for separating the catalyst from the effluent gas and indirect cooling means surround the filtering means in indirect heat exchange relationship such that a gas cooling and catalyst cooling and settling zone is formed adjacent to and coextensive with the exterior filtering surfaces.

Description of the preferred embodiments

Figure 1:
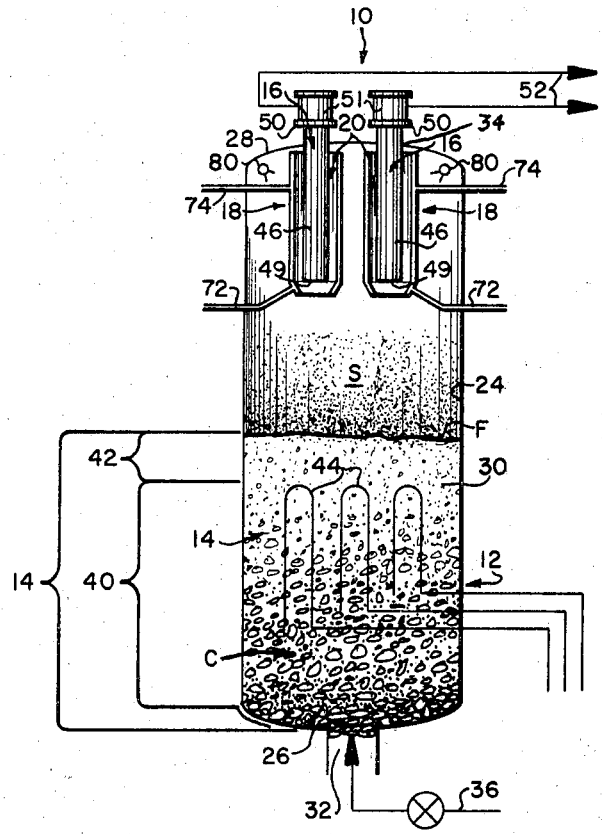
FIG. 1 is a schematic representation of a phthalic anhydride recovery apparatus.

Referring now to the drawings, the invention will first be described in connection with the specific application of the apparatus, for producing a phthalic anhydride-containing gas, which is generally designated by the reference numeral 10. The apparatus 10 comprises a reactor vessel 12, the interior portion of which is provided with a fluidized bed 14 consisting of a suitable metal oxide catalyst for producing a chemical reaction to produce the phthalic anhydride-containing effluent gas from oxygen and either naphthalene or ortho-xylene. A filtering zone 16 is located above fluidized bed 14 in reactor vessel 12 for separating the catalyst entrained in the effluent gas. A pair of cooling enclosures 18 surround filtering bundles in filtering zone 16 in indirect heat exchange relationship, such that a gas cooling and catalyst cooling and settling zone 20 is formed in reactor vessel 12 adjacent to and coextensive with the external filter surface in zone 16.

The reactor vessel 12 is integrally formed with a cylindrical wall 24, bottom wall 26, and top wall 28, which define an internal chamber 30. The internal chamber 30 is provided with an inlet opening 32 in bottom wall 26 and outlet openings 34 in top wall 28. An inlet line 36 is shown schematically in FIG. 1 for introducing, into internal chamber 30 through inlet opening 32 a fluid feed from the group consisting of naphthalene and ortho-xylene which is mixed with an oxygen-containing gas entering through opening 32.

The fluidized bed 14 is comprised of a suitable metal oxide catalyst C supported on bottom wall 26. The catalyst C consists of metal oxides selected from Group V–B or VI–B on suitable carriers such as alumina, silica gel, pumice, kieselguhr. For example, the catalyst C could consist of the following formulation: a silica gel carrier; 5.5% $V_2O_5$; and 35% $K_2SO_4$. As illustrated by the brackets in FIG. 1, the catalyst bed 14 includes a dense catalyst zone 40 which extends upwardly along cylindrical wall 24 from bottom wall 26 and a light catalyst zone 42 which extends along cylindrical wall 24 from the end of zone 42 to a frothy layer designated F. Direct contact cooling tubes 44 are provided in dense catalyst zone 40 and a relative cooling medium such as water is passed through tubes 44.

Due to the decreasing pressure of the effluent gas and the expansion of the catalyst mass through frothy layers F, an eruption of heavy bubbling occurs, thereby lifting the catalyst, with portions of the catalyst being thrown high into the space above the surface of frothy layer F. The catalyst C promotes the chemical reaction between the oxygen and naphthalene or ortho-xylene such that a phthalic anhydride-containing effluent gas is produced, and this effluent gas which passes above frothy layer F includes phthalic anhydride and suspended particles of the catalyst C. The suspended catalyst particles are in the form of a fine dust which is designated by the letter S.

Figure 3:
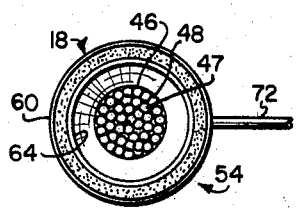
FIG. 3 is a transverse sectional view taken along the line 3—3 of FIG. 2 and looking in the direction of the arrows.

In order to prevent the loss of the suspended catalyst particles in the effluent gas, filtering zone 16 is provided. The filtering zone 16 includes a pair of filter bundles 46 which depend from the top wall 28 through opening 34. Each of the individual filter bundles 46 are comprised of individual filter elements 47 which are held together by a coarse screen 48. The filter bundles 46 are mounted on top wall 28 with a non-porous closed end 49 in internal chamber 30 and a porous filter exhaust end 50 connected to exterior gas chambers 51 for receiving the phthalic anhydride-containing effluent gas. Although the filter bundles 46 are shown having a circular cross-section in FIG. 3, it should be understood that the cross-sectional shape may vary, thereby resulting in filter bundles 46 having configurations which are different than the cylindrical shape shown in the drawings. A pair of outlet lines 52 from the gas chambers 51 are shown schematically for conveying the phthalic anhydride-containing effluent gas from chambers 51 to the condenser which is not shown in the drawing. From the foregoing, it can be appreciated that the filtering zone 16 is bounded by porous sheets 48, and closed ends 49 prevent the filtering of the effluent gas without cooling taking place.

Figure 2:
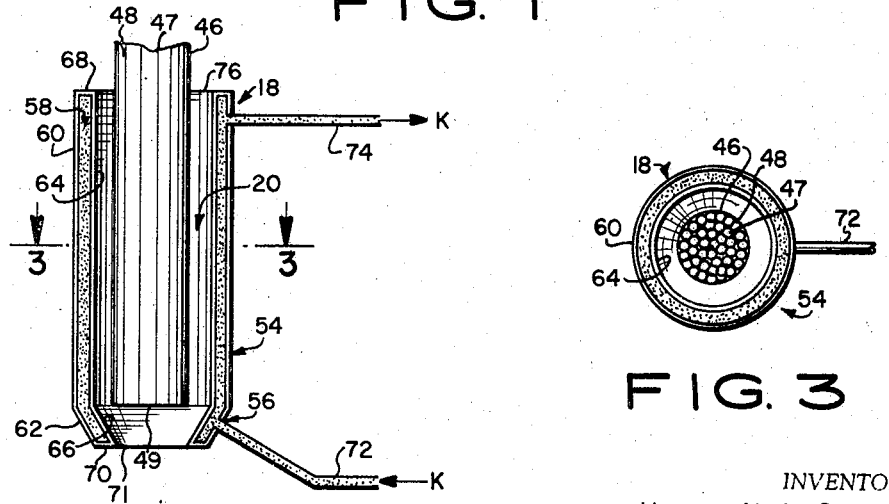
FIG. 2 is an enlarged sectional view of the cooling enclosures which are in indirect heat exchange relationship with the filters in the reactor vessel.

As best shown in FIG. 2, each of the cooling enclosures 18 includes a cylindrical section 54 integrally formed with a frustoconical section 56 which converges inwardly from section 54. Each enclosure 18 is formed with a substantially annular internal cooling circuit 58 which is defined by an outer cylindrical wall 60 integrally formed with an outer frustoconical wall 62; an inner cylindrical wall 64 integrally formed with an inner frustoconical wall 66; a top wall 68 mounted on the ends of cylindrical walls 60 and 64; and a bottom annular wall 70 mounted on the bottom ends of conical walls 62 and 66. A central nozzle opening 71 is formed in frustoconical section 56, which is defined by the inner diameter of annular wall 70. It should be noted that conical section 56 and nozzle opening 71 are formed to direct the catalyst particles separated from the effluent gas, to fall downwardly. The coolant designated by the letter K is passed through an inlet line 72 which is connected to outer conical wall 62 in flow communication with cooling circuit 58 and the coolant K is conveyed out of cooling circuit 58 through outlet line 74 which is connected to cylindrical wall 60. The lines 72 and 74 pass through cylindrical wall 24 and usually communicate with heat recovery equipment which is not shown in the drawings. The enclosures 18 are mounted in internal chamber 30, such that wall 68 is close to wall 28. Thus, the major portion of the effluent gas does not pass through the non-cooled segment of filter bundle 46 which is located in the space between walls 68 and 28. Each of the inner walls 64 are sized with a cross-sectional area, such that the filter bundles 46 can be coaxially disposed within cooling enclosure 18. By mounting filter bundles 46 in the enclosures 18, annular inlet openings 76 are formed between filter bundles 46 and the inner circumference of top walls 68; and nozzle openings 71 and frustoconical wall 66 are located below closed end wall 49. Accordingly, between each inner cylindrical wall 64 and the outer surface of each filter bundle 46 there is a space having a substantially annular cross-section which forms the gas cooling and catalyst cooling and settling zone 20 for the effluent gas which enters through annular opening 76 and passes through coarse screen 48 into filter bundle 46. Thus, the phthalic anhydride-containing effluent gas is cooled in zone 20 without dilution occurring and catalyst particles are returned to fluidized bed 14 through nozzle openings 71.

Any type of coolant can serve as the cooling medium which is passed through circuit 58, depending on the thermodynamic characteristics of the apparatus. For example, water could be used as the cooling medium in the phthalic anhydride reactor 12. In practice, the circulated water coolant would undergo internal bubbling, and portions could be vaporized and superheated in order to control the desired degree of cooling. In another example, Dowtherm (a registered trademark of the Dow Chemical Company) could be pumped through cooling circuit 58.

It should be noted that substantially no catalyst material will adhere to the outer cooling surfaces of the enclosure 18 because cooling circuit 58 is vertically disposed with respect to internal reactor chamber 30. In the event that some catalyst particles do adhere to the outer cooling surfaces of enclosure 18, there has been provided a pair of high velocity air jets 80 which are mounted in internal chamber 30 on top wall 28. In this manner, any catalyst particles which may adhere to the exterior cooling surfaces of enclosure 18 can be blown off.

The nozzle openings 71 on conical sections 56 are sized in accordance with the cross-sectional diameter of filter bundles 46. It is preferable that nozzle openings 71 be sized to enclose substantially 10% of the cross-sectional area of inner cylindrical wall 64.

From the foregoing, it can be appreciated that the enclosures 18 are provided with the gas cooling and catalyst cooling and settling zones 20. Accordingly, a portion of the catalyst C will have settled out before the effluent gas passes through filter bundles 46, thereby reducing the build-up of caked catalyst particles on the filtering surfaces. It is the usual practice to blow air back through the filters to remove excessive caked-on catalyst particles, which are dislodged and fall vertically down through nozzle opening 71. The actual blow-back equipment is conventional and has not been shown in the drawings.

The process for recovering phthalic anhydride in accordance with the present invention is best illustrated by reference to the reactor vessel 12 in FIG. 1. Accordingly, a phthalic anhydride-containing effluent gas is produced in fluidized bed 14 by reacting oxygen and either naphthalene or ortho-xylene in the presence of a suitable metal oxide catalyst and cooling tubes 44. The phthalic anhydride-containing effluent gas is passed through filtering zone 18, with only an essentially small portion thereof entering filter bundles 46 through nozzle opening 71, and the remainder of such effluent gas entering through the annular opening 76 and passing down through zone 20 and then through porous sheets 48 into the outer elements 47 of filter bundles 46. Thus, in zone 20, the phthalic anhydride-containing effluent gas is cooled and the catalyst particles suspended in the effluent gas are cooled and settle, such that the catalyst particles descend downwardly through nozzle opening 71 to fluidized bed 14. Unsettled catalyst particles are left behind on filter bundles 46 and the effluent gas is passed through filter bundles 46 into gas chambers 51 and out through lines 52.

In order to more clearly describe the present invention, reference is made to the following specific examples:

Example I

When naphthalene is charged into a fluid bed reactor designed in accordance with the prior art, it is necessary to admit air into the reaction zone in ratios in a range from 9 to 20 weight parts per part of naphthalene, and a reaction takes place which is controlled by heat removal in the fluid bed heat exchanger to a temperature of approximately 350° C. In order to cool the effluent leaving the fluid bed with quenching air so that a temperature of about 290 to 300° C. is obtained, before the effluent gas is permitted to leave the reaction vessel or enter the catalyst filter, about 3 weight parts of additional air at a temperature of about 35° C. is required. The amount of quenching air varies depending upon the efficiency of the catalytic reaction but usually will remain within the range of 3 to 5 weight parts when the air is admitted to the main reaction zone in approximately 15 weight parts per part of naphthalene. Under these conditions the mol fraction of phthalic anhydride will decrease from approximately 0.0134 at the point of leaving the reaction zone to a 0.0101 mol fraction after dilution with quenching air. Accordingly, it can be appreciated that the mol fraction of phthalic anhydride is reduced to a range of between 75 to 85% of the phthalic anhydride concentration leaving the reaction zone.

Example II

When an indirect cooling means 18 in accordance with the present invention is operated in accordance with the air to naphthalene ratios from Example I, it is possible to substantially eliminate the use of quenching air and thereby increase the phthalic anhydride mol fraction. It should be noted that in the operation of a fluid bed reactor in accordance with the prior art, the resulting concentration of phthalic anhydride in the effluent gas would permit the condensing of no more than 24% of the phthalic anhydride present before a temperature of 140° C. is reached. This temperature is only about 9° C. above the subliming temperature for phthalic anhydride and substantially no phthalic anhydride can be condensed in the liquid form in actual practice because of the dilution of the phthalic anhydride in the reactor effluent as a result of the total air injected into the combined reaction and quenching zones. When a fluidized bed reactor is equipped with applicant's indirect cooling means 18, the dew point of the phthalic anhydride in the effluent gas mixture is raised about 7° C. and approximately 35% of the phthalic anhydride present in the now more concentrated effluent gas can be condensed in liquid form before a temperature of 140° C. is reached.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. Apparatus for producing a phthalic anhydride-containing gas comprising a reactor vessel formed with an internal chamber having an inlet opening and an outlet opening, means for introducing an oxygen-containing gas into said internal chamber, means for introducing a fluid feed from the group consisting of naphthalene and ortho-xylene into said internal chamber, a fluidized bed in said internal chamber comprising a suitable metal oxide catalyst capable of producing a chemical reaction to obtain said phthalic anhydride-containing effluent gas with catalyst particles suspended therein, indirect cooling means in said internal chamber in contact with said fluidized bed, filtering means in said internal chamber for separating said catalyst particles from said effluent gas, and indirect cooling means surrounding said filtering means in indirect heat exchange relation such that a gas cooling and catalyst cooling and settling zone is formed adjacent to and coextensive with the exterior filtering surfaces.

2. Apparatus according to claim 1 wherein said metal oxide catalyst is a vanadium pentoxide catalyst supported by a suitable carrier, and said reactor vessel is cylindrically shaped and vertically oriented with respect to said inlet and outlet openings and said indirect cooling means surrounding said filtering means includes an annular cylinder vertically oriented in said reactor vessel.

3. Apparatus according to claim 1 in which said internal chamber is defined by a vertically oriented cylindrical wall integrally formed with a top wall and bottom wall, said filtering means include a pair of filter bundles having a cylindrical configuration and depending from said top wall into said internal chamber, said indirect cooling means surrounding said filtering means includes a pair of annularly cross-sectioned cylindrical sections integrally formed with inwardly diverging frustoconical sections, each of said cylindrical sections and frustoconical sections defined by an outer wall which is spaced apart from an inner wall section to form a hollow internal cooling chamber, and each of said cylindrical sections being sized with an inner wall cross-sectional area such that each of said filter bundles can be coaxially positioned within each of said cylindrical sections.

4. Apparatus according to claim 3 in which said filter bundles are formed with a cylindrical outer wall, and said inner wall of said cylindrical section is spaced apart from said outer wall of said filter bundles to form said gas cooling and catalyst cooling and settling zone.

5. Apparatus for producing a phthalic anhydride-containing gas comprising a reactor vessel formed with an internal chamber defined by a vertically-oriented cylindrical wall integrally formed with a bottom wall having an inlet opening and a top wall having an outlet opening, means for introducing an oxygen-containing gas into said interal chamber, means for introducing a feed fluid from the group consisting of naphthalene and ortho-xylene into said internal chamber, a fluidized bed in said internal chamber comprising a suitable metal oxide catalyst selected from Group V–B and VI–B of the periodic table and said fluidized bed being capable of producing a chemical reaction to obtain said phthalic anhydride-containing effluent gas with catalyst particles suspended therein, cooling tubes in said internal chamber in contact with said fluidized bed, a pair of filter bundles in said internal chamber for separating said catalyst particles from said effluent gas, said filter bundles having cylindrical outer walls and depending from said top wall through said outlet opening into said internal chamber, and a pair of annularly cross-sectioned cooling enclosures each of which includes a cylindrical section and an inwardly converging frustoconical section integrally formed with an outer wall which is spaced apart from an inner wall to define a hollow internal cooling circuit, and each of said cooling enclosures sized with an internal cross-sectional area such that each of said filter bundles can be coaxially positioned within each of said cooling enclosures with said inner walls of said enclosures being spaced apart from said outer walls of said filter bundles to form a gas cooling and catalyst cooling and settling zone whereby said phthalide anhydride-containing gas is cooled without dilution and said catalyst particles are returned to said fluidized bed.

References Cited

UNITED STATES PATENTS

| | | |
|---|---|---|
| 2,391,534 | 12/1945 | Yerrick et al. |
| 2,394,710 | 2/1946 | McAfee. |
| 2,428,914 | 10/1947 | Kassel. |
| 2,453,740 | 11/1948 | Becker. |
| 2,458,960 | 1/1949 | Roetheli et al. _____ 23—288 |
| 2,474,583 | 6/1949 | Lewis. |
| 2,585,274 | 2/1952 | Reichl _____ 23—288 |
| 2,903,419 | 9/1959 | Howard _____ 23—288 XR |
| 3,055,745 | 9/1962 | Drummond et al. _____ 23—288 |

MORRIS O. WOLK, Primary Examiner

BARRY S. RICHMAN, Assistant Examiner

U.S. Cl. X.R.

23—284.1; 260—346.7

UNITED STATES PATENT OFFICE
CERTIFICATE OF CORRECTION

Patent No. 3,480,408                November 25, 1969

Henry N. LaCroix

It is certified that error appears in the above identified patent and that said Letters Patent are hereby corrected as shown below:

Column 1, line 35, "$C_8H_{10}$(ortho-xylene)+$3O_2$" should read -- $C_{10}H_8$(naphthalene)+4 1/2 $O_2$ --.

Signed and sealed this 27th day of October 1970.

(SEAL)
Attest:

Edward M. Fletcher, Jr.
Attesting Officer

WILLIAM E. SCHUYLER, JR.
Commissioner of Patents